United States Patent [19]

Nix

[11] 4,020,723
[45] May 3, 1977

[54] TENSILE TEST SAMPLE MAKING MACHINE

[75] Inventor: Andrew B. Nix, Altoona, Ala.

[73] Assignee: The United States of America as represented by the Secretary of the Army, Washington, D.C.

[22] Filed: Oct. 16, 1975

[21] Appl. No.: 623,126

[52] U.S. Cl. .................................. 83/268; 83/281; 83/437
[51] Int. Cl.² .......................................... B26D 5/20
[58] Field of Search ..................... 83/268, 437, 281

[56] References Cited

UNITED STATES PATENTS

| 267,574 | 11/1882 | Mundell et al. | 83/281 |
| 2,963,931 | 12/1960 | Lamoureux | 83/281 |
| 3,180,195 | 4/1965 | Clark | 83/437 |
| 3,774,487 | 11/1973 | Topliffe | 83/437 |
| 3,788,179 | 1/1974 | Vallier | 83/437 |

*Primary Examiner*—Donald R. Schran
*Attorney, Agent, or Firm*—Nathan Edelberg; Robert P. Gibson; Harold W. Hilton

[57] ABSTRACT

An air powered machine that die cuts tensile test samples of solid propellant. The machine is remotely controlled, as a safety feature, to permit safe cutting of the propellant. The machine includes a feed mechanism for feeding a propellant slab to a cutter which cuts the slab into a "dog bone" shape.

4 Claims, 5 Drawing Figures

TENSILE TEST SAMPLE MAKING MACHINE

DEDICATORY CLAUSE

The invention described herein may be manufactured, used, and licensed by or for the Government for Governmental purposes without the payment to me of any royalties thereon.

BACKGROUND OF THE INVENTION

Bulk propellant is first cut into slabs (approximately 1 × 5 × ¼ or ½ inch) and the slabs are placed into the remote controlled apparatus of the present invention to be cut into the desired dog bone shape for mechanical property testing.

When cutting solid propellants for such mechanical property testing it is hazardous to the operator to be in the vicinity of the cutting operation, particularly, during the standard guillotine cutting operation. There is a constant possibility of fire or explosion while cutting solid propellants.

SUMMARY OF THE INVENTION

Apparatus for cutting a slab of solid propellant into a predetermined dog bone shape for mechanical property testing thereof. The apparatus includes a pair of remotely controlled reciprocating air cylinders, the first of which moves a feed mechanism into engagement with the propellant slab for displacement thereof from a holder into position beneath the second cylinder. The second cylinder is disposed for downward movement of a cutting mechanism for cutting the slab into the desired dog bone configuration. Responsive to the cutting operation, the operator moves a lever to retract the feed device and the cutter for subsequent feeding and cutting operations.

DESCRIPTION OF THE PREFERRED EMBODIMENT

Figure 1:
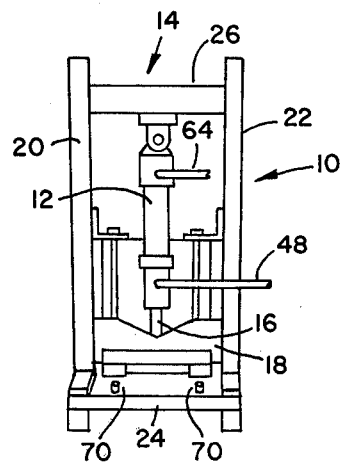
FIG. 1 is a pictorial view of the apparatus showing the cutter and power cylinder therefor.

As shown in FIG. 1, the tensile test sample making machine 10 of the present invention includes a two-way air cylinder 12 supported on a frame 14. The air cylinder 12 includes a rod 16 which has one end attached to the air cylinder piston while the other end is attached to a cutting device 18. Frame 14 includes a pair of spaced upstanding members 20 and 22, a base member 24, and an upper cross-over member 26 to which one end of the cylinder 12 is attached.

Figure 2:
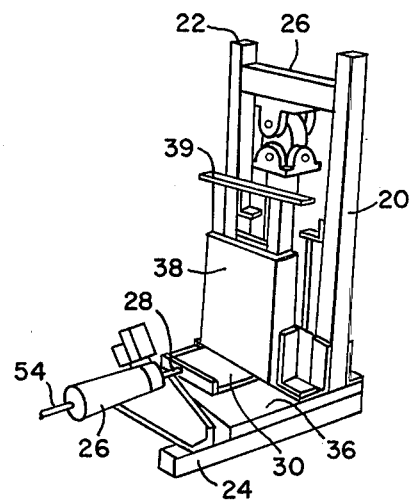
FIG. 2 is a pictorial view of the apparatus showing the feed mechanism and power cylinder therefor.

A second two-way cylinder 26 (FIG. 2) is secured to base member 24 and includes a rod 28 which has one end attached to the air cylinder piston and the other end is attached to a feed device 30. Feed device 30 includes a horizontally extending member having a substantially L shaped cross-sectional configuration. The upstanding portion of the L, 32 (FIG. 3) is attached to the piston rod and the forwardly extending portion of the L, 34 is longer than portion 32 and is disposed in parallel sliding relation with the upper 36 surface of base member 24.

A rectangular storage box 38 is secured to frame 14 in spaced relation with upper surface 36. The propellant slabs are stacked in storage box 38 and a weight 39 is placed on top of the stacked slabs to force them downwardly into the space 40 between the box 38 and upper surface 36. Space 40 is just slightly greater than the thickness of the propellant slab 42 (FIG. 4).

Figure 4:
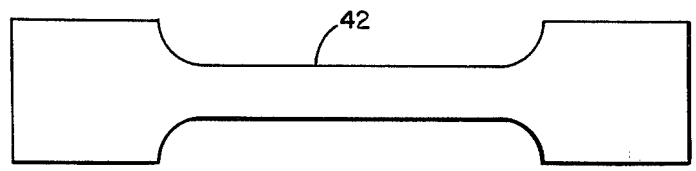
FIG. 4 is an elevational view of the dog bone configuration of the finished propellant sample.

Cutting device 18 is provided with a cutting surface which cuts the rectangular propellant slab into the dog bone configuration shown in FIG. 4.

Figure 3:
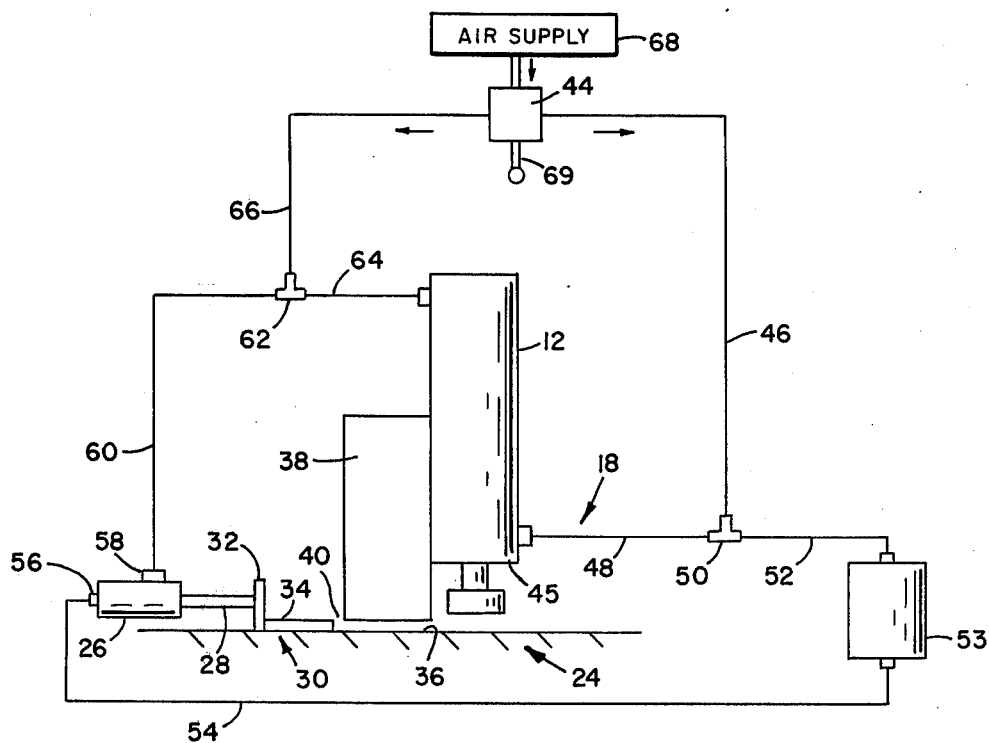
FIG. 3 is a diagrammatic view illustrating both power cylinders and pneumatical lines therefor.

The diagrammatic flow diagram of FIG. 3 illustrates the pneumatic hook-up of the apparatus. As shown in FIG. 3, the forward portion 45 of the first two-way cylinder 12 is connected to a control box 44 through lines 46 and 48 which are connected by a T connection 50. A third line 52 from connection 50 is secured to a control valve 53. A line 54 extends from control valve 53 into the aft end 56 of a second two-way air cylinder 26.

A second control valve 58 communicates with the forward interior of cylinder 26 and a pneumatic line 60. Line 60 connects into a T connection 62. A second line 64 extends from the T connection into the aft end of air cylinder 12. The third line 66 from connection 62 extends into control box 44 which is connected to a source of air 68.

Control valves 53 and 58 are commercially available valves and are merely utilized to adjust the air flow into and out of the cylinders.

Figure 5:
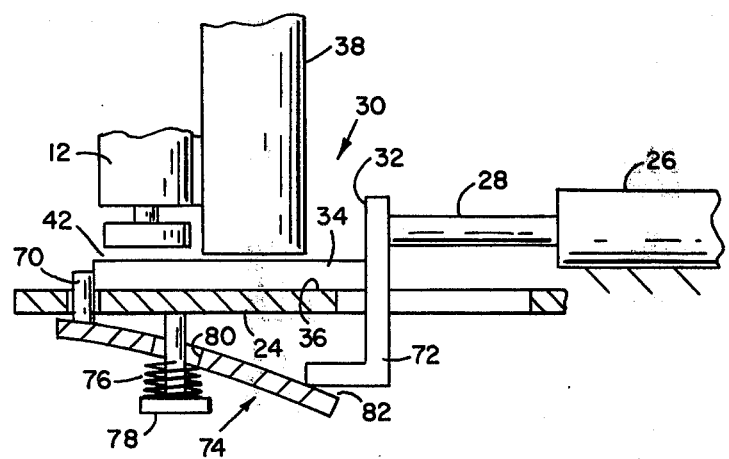
FIG. 5 is a diagrammatic side view of the propellant stop mechanism.

A pair of stops 70 (FIG. 1) is disposed to be raised in position as shown in FIG. 5, to hold the specimen 42 beneath cutter 18. The stops 70 are raised into their upward position responsive to engagement of an L shaped arm 72 (FIG. 5) with a plate 74 which is secured in biased relation to the underside of base 24. Springs 76 are disposed about a nut 78 which is secured to the underside of base 24 and extends through an opening 80 in plate 74. Springs 76 bias plate 74 upwardly. Engagement of member 72 with a downwardly extending portion 82 of plate 74 extends stops 70 upwardly. The engagement occurs responsive to forward movement of the piston in cylinder 26.

In operation, the operator loads the slabs into storage box 38 and places weight 39 on top of the slabs. One of the slabs falls into space 40 between the upper surface 36 and storage box 38. The operator moves lever 69 (FIG. 3) so that air is allowed to flow through line 46 and 52, control valve 53 and line 54 to the aft end of cylinder 26. Forward movement of the piston in cylinder 26 causes feed element 34 to engage specimen 42 for movement thereof under cutting device 18. At this time member 72 engages plate 74 for upward movement of stops 70 to retain the specimen in position. Responsive to movement of specimen 70 into position, air flows through control valve 58 lines 60, 62, and 64 behind the piston in cylinder 12 for downward movement thereof whereby the cutter engages the specimen. The operator then moves lever 69 the opposite direction to retract the pistons in both cylinders so that a slab may fall back into opening 40. Responsive to rearward movement of feed member 30, stops 70 are retracted, a new slab is dropped into space 40 and another sequence can begin. The location of plate 74 relative to member 72 permits the stop 70 to be retracted until a second slab is moved forward to displace the first slab and excess cuttings. After the first cut slab has been displaced by the second slab the pins engage the edges of the second slab for retention thereof under the cutter 18.

I claim:

1. Apparatus for die cutting tensile test samples from a slab of solid propellant comprising:
   a. support means including a base member;
   b. storage means for retention of said slabs thereof in stacked relation, said storage means being in spaced relation with the upper surface of said base member and open at its bottom whereby the bottom slab assumes a first position in said space between said upper surface and said storage means;
   c. feed means for engagement with said bottom slab for movement thereof to a second position;
   d. stop means for retention of said slab in said second position, said stop means including a pair of pins extending through openings in said base member, a plate having said pins secured thereto, said plate being secured in biased relation to the bottom surface of said base and provided with a downwardly extending lip, an L shaped member secured to said feed member and extending under said base member for engagement with said downwardly extending lip for upward pivotal movement of said pins through said base member;
   e. cutting means disposed for cutting said slab to a predetermined configuration responsive to movement of said slab to said second position.

2. Apparatus as in claim 1 wherein said cutting means includes a first two-way air cylinder having a piston therein, a rod extending out of said cylinder and a cutter having a dog bone configuration for cutting said slab to said dog bone configuration.

3. Apparatus as set forth in claim 2 wherein said feed means includes a second two-way air cylinder having a piston therein, a rod extending therefrom, and a feed member secured to said rod in parallel relation with said upper surface, said feed member disposed for engagement with said slab for movement thereof to said second position responsive to displacement of said piston.

4. Apparatus as in claim 3 including a control box connected to said cylinders for selectively routing air to each said cylinder, said control box being remotely positioned from said apparatus.

* * * * *